Figure 1:
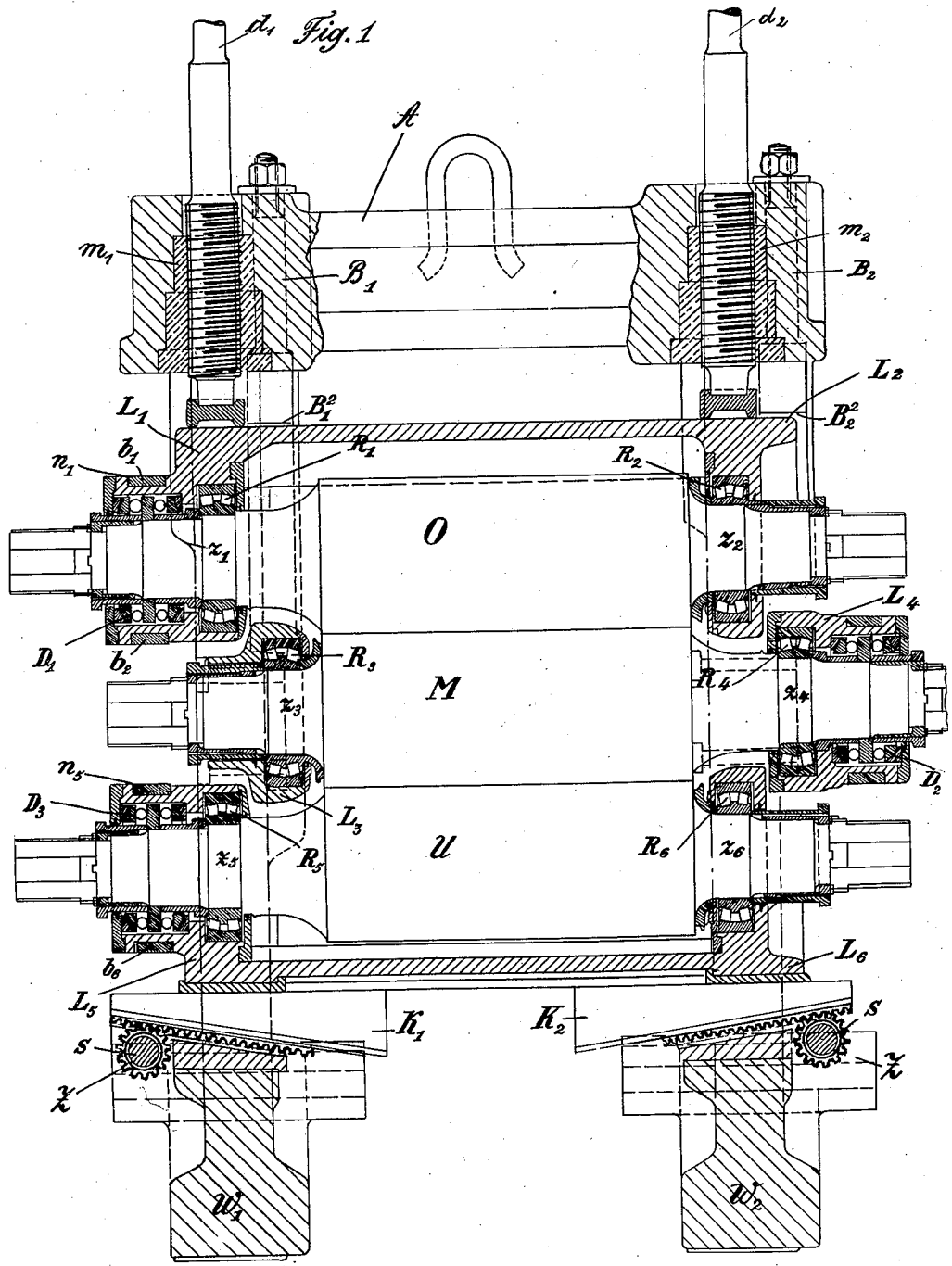

April 7, 1925.

R. HEIN

ROLLING MILL

Filed Dec. 26, 1922

1,532,488

6 Sheets-Sheet 2

Inventor:
Richard Hein
By: Herbert G. Ry
Attorney.

April 7, 1925.　　　　　　　　　　　　　　　　　　　　　1,532,488
R. HEIN
ROLLING MILL
Filed Dec. 26, 1922　　　6 Sheets-Sheet 3
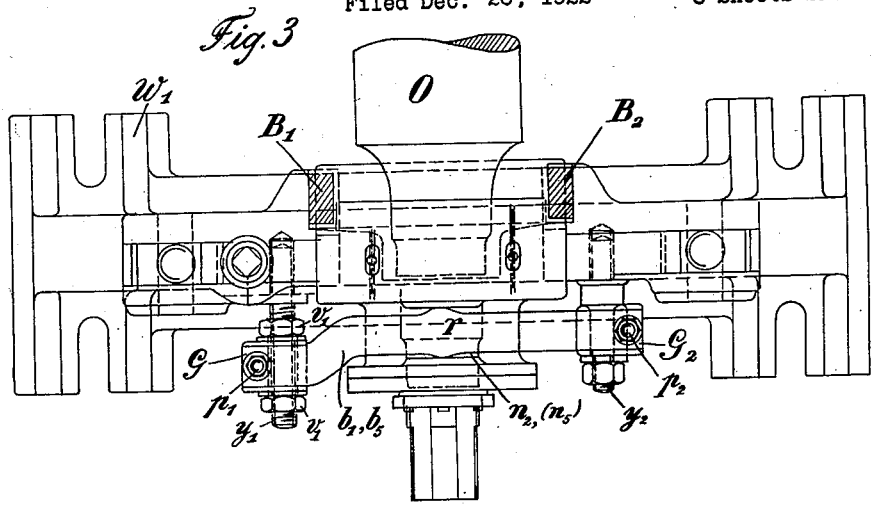
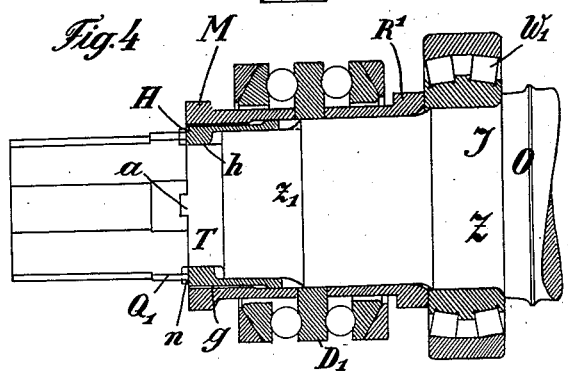
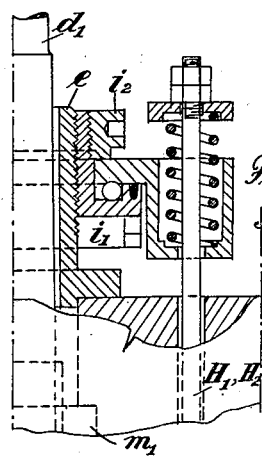
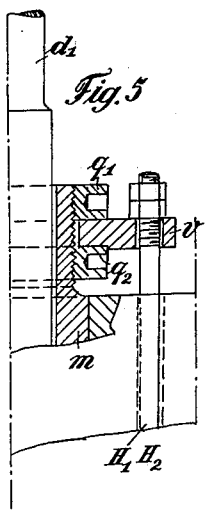
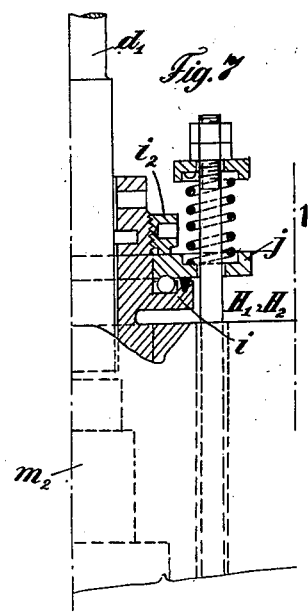
Inventor:
Richard Hein
By: Herbert G. Ry
Attorney.

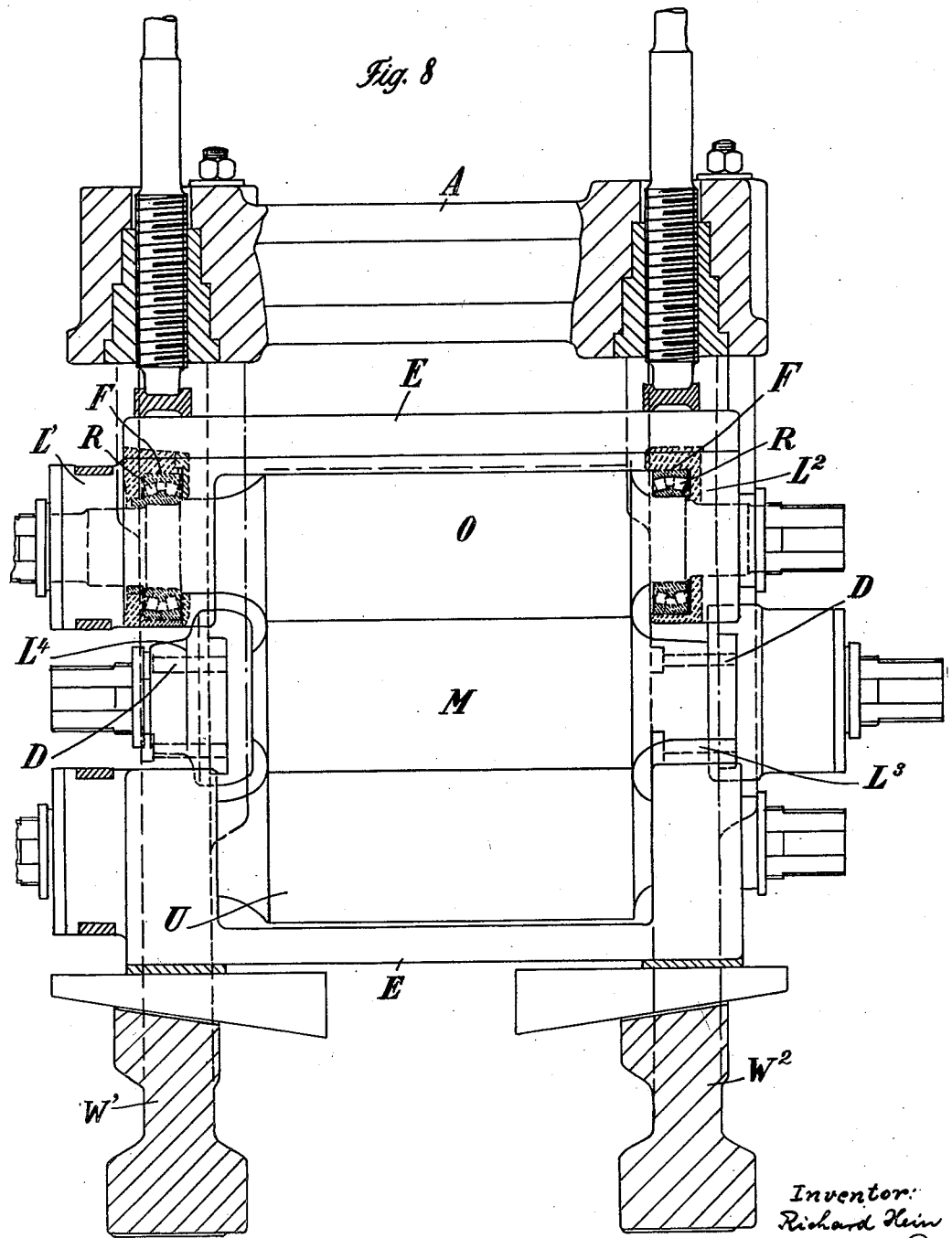

April 7, 1925.
R. HEIN
1,532,488
ROLLING MILL
Filed Dec. 26, 1922
6 Sheets-Sheet 5
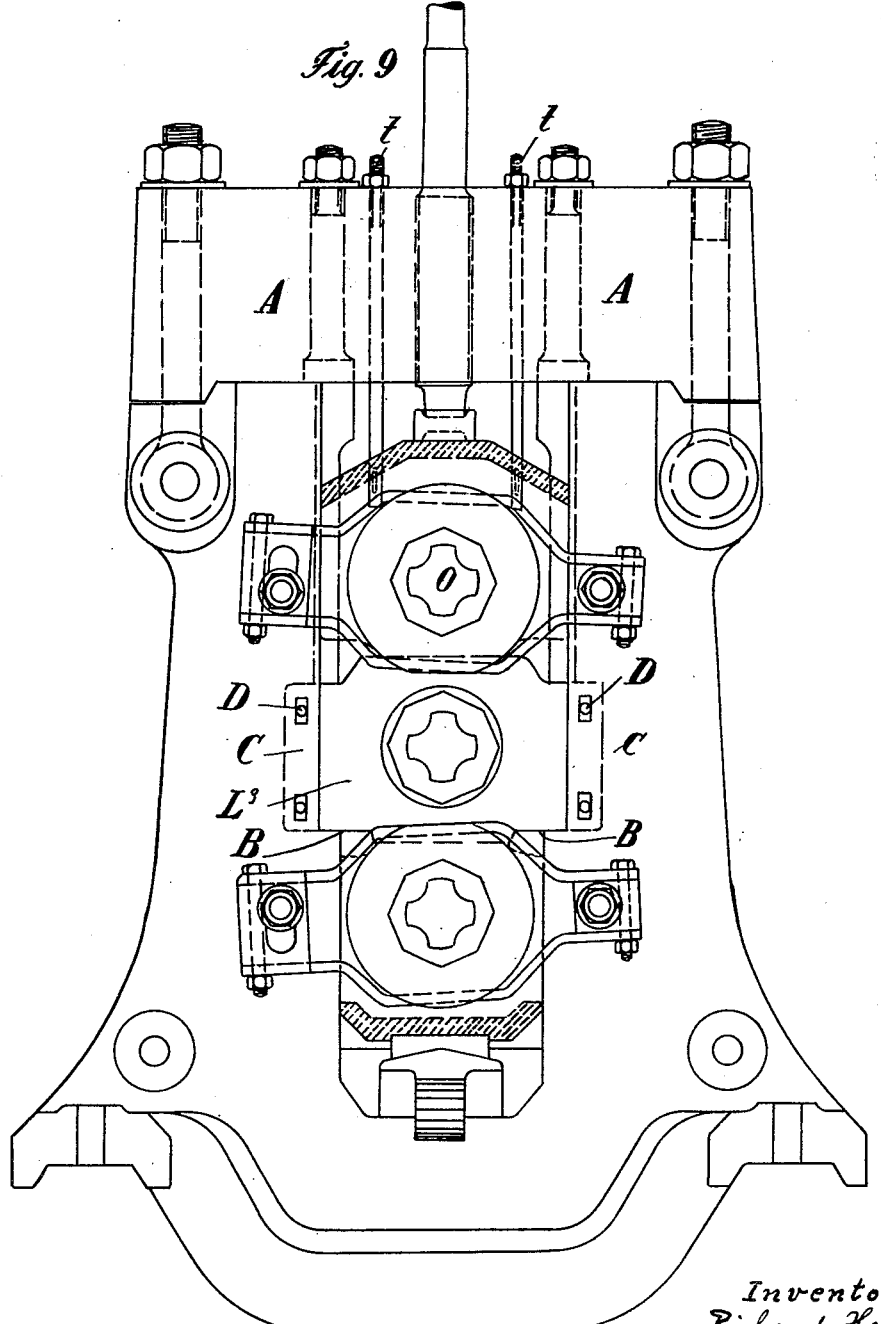
Inventor:
Richard Hein

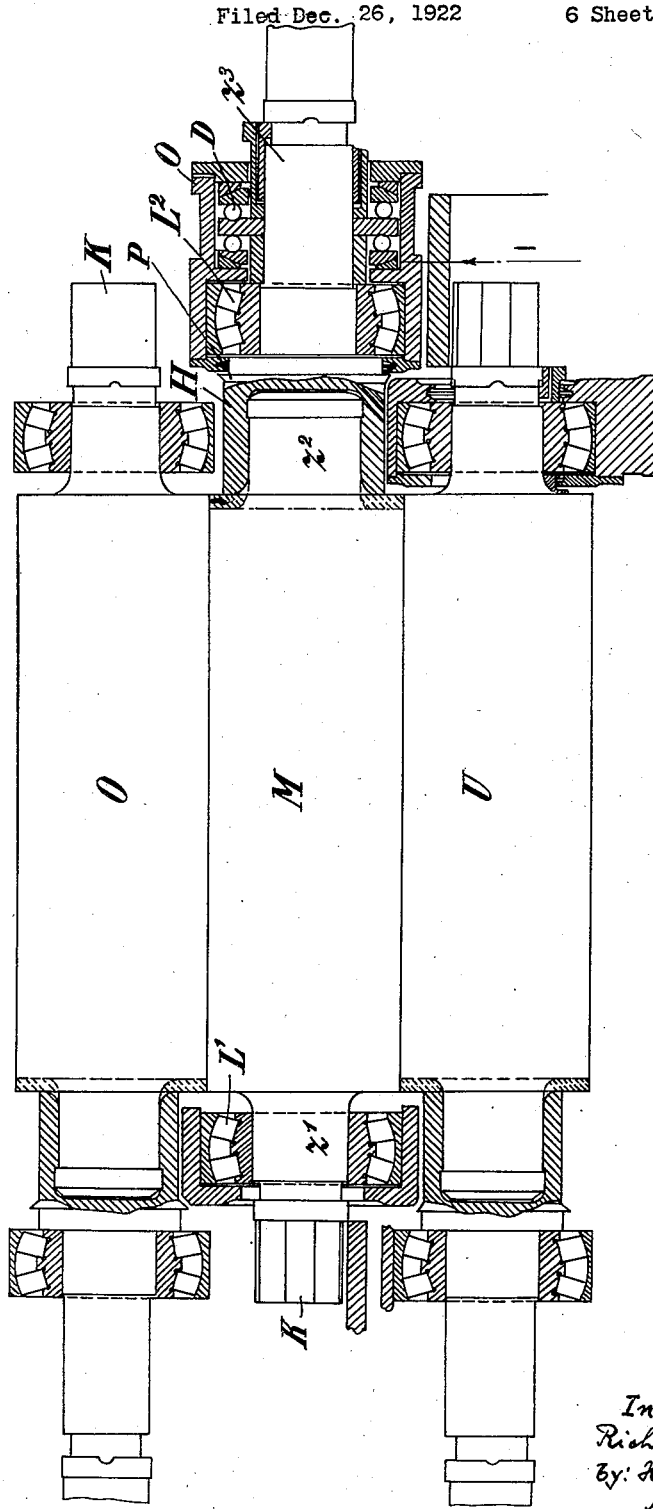

Patented Apr. 7, 1925.

1,532,488

UNITED STATES PATENT OFFICE.

RICHARD HEIN, OF WITKOWITZ, CZECHOSLOVAKIA.

ROLLING MILL.

Application filed December 26, 1922. Serial No. 609,122.

*To all whom it may concern:*

Be it known that I, RICHARD HEIN, a citizen of the German Republic, and a resident of Witkowitz, Czechoslovakia, have invented a new and useful Rolling Mill, of which the following is a specification.

The rolls and the journal bearings or supports, or the chocks respectively, of rolling mills, especially when constructed as three-high-mills, cannot be made, as is known, so strong that they are apt to stand the compressive stress arising during the rolling. This fact is due to the dependency of the diameter of the rolls which is a given magnitude. To house the bearings, only such a height is at disposal as corresponds to the diameter of the rolls, and, besides, the fact must be considered that the rolls when being worn off must be turned off whereby the diameter of each thereof is diminished by about one tenth. These causes give rise to a construction that is rather weak in proportion to the roll pressure, in consequence of which fractures and deflections of the bearings may occur.

The object of the present invention is to obviate these drawbacks, and for this purpose the space required for the housing of the roll bearings is procured by positioning the bearings of the several rolls in staggered arrangement, without, however, altering the distance between the centres of the journal bearings of each individual roll, or making these distances different among each other. But as regards each individual roll, the distance between the center of one of its journal bearings and its middle plane is different from the distance between the centre of its other journal bearing and that plane.

The invention is, thus, especially suited for the employment of ball and roller bearings for the roll-journals, as these bearings require, as is known, particularly great housing heights.

Now, in order to be able to effect with such bearings the axial adjustment of the rolls in a manner which does not impair the security of the service, the roll is, according to the present invention, shifted simultaneously with its two bearings and the housing accessories which is rendered possible by connecting rigidly with each other the bearing housings, or the accessories respectively.

Another object of the invention is to render possible the use of the novel bearing arrangement also in connection with old rolls where normally, as is known, the journal supporting means are located in equal distances from the middle plane. For this purpose that journal which serves for the reception of the staggered roll bearing, i. e. that bearing which lies more distant from the middle plane, is fastened on the journal stump remaining after the removal of the wobbler of one journal of the old roll, the fastening being preferably effected by means of a cap, sleeve, box, or similar device.

The fastening means are of course, made preferably integral with the bearing journal. The fastening may be effected by shrinking said means upon the journal stump, or in any other suitable manner. This non-employed journal is, preferably, so dimensioned that it is able to support also an axial thrust bearing provided at the side of the bearing for the roll.

Fastening upon the roll journal the inner ring which serves to retain the bearing in axial direction is effected, according to the present invention, by putting the inner rings under tension by means of sleeves that are to be shoved upon the roll journals and are secured against rotation and may serve also for retaining special thrust bearings, if such are provided.

Figure 2:
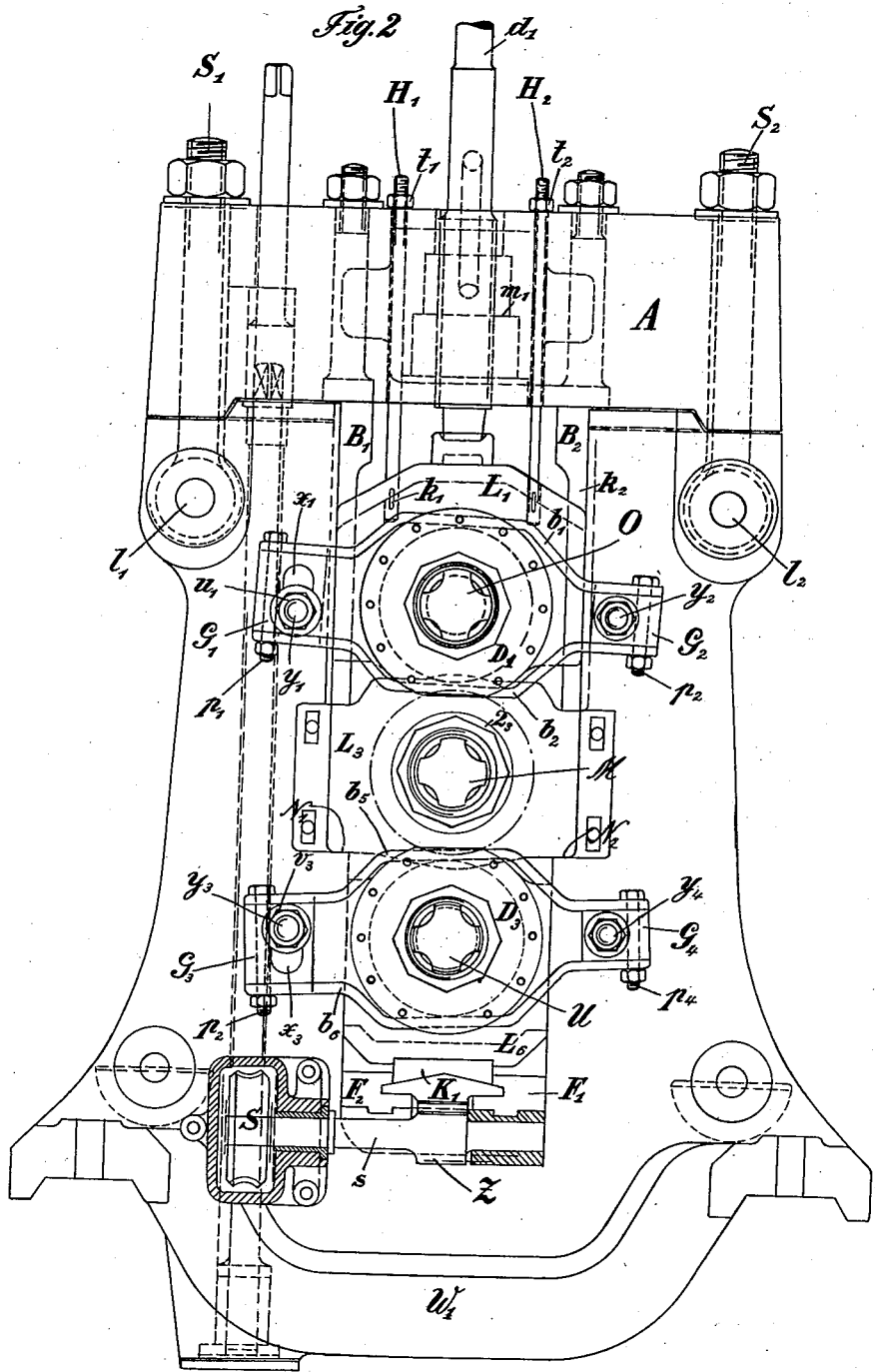

The invention is illustrated, by way of example, in the accompanying drawings, in which Figure 1 is a vertical section of a three-high rolling mill provided with the novel arrangement and combination of parts; Figure 2 is a side-view of Figure 1; Figure 3 is a plan of the supporting members of the upper roll; Figure 4 is a transverse section of the fastening means for the inner ring; Figure 5 is a vertical section of the device for lifting and lowering both ends of the upper roll at a time; Figure 6 is a similar illustration showing another form of construction of this device; Figure 7 is also a similar illustration showing still another form of construction of that device; Figure 8 is an illustration similar to Figure 1 and shows a form of construction of the rolling mill in which the rolls can be axially shifted; Figure 9 is a side-view of this form of construction; Figure 10 is a front view, partly in vertical section, of three rolls and shows that form of construction of the invention which has been devised for old rolls.

Referring to Figures 1 and 2, $W^1$ $W^2$ are the housings or stands, in which the lower roll U with its bearings $L^5$ $L^6$, the middle roll M with its bearings $L^3$ $L^4$, and the lower roll with its bearings $L^1$ $L^2$, are supported. The middle plane of the rolling mill frame stands vertically with respect to the roll axes, and the journals $z^1$ $z^2$ of the upper roll are arranged in unequal distances from that plane; the same is the case as regards the journals $z^3$ $z^4$ of the middle roll and the journals $z^5$ $z^6$ of the lower one. The journals and the bearings of the superposed rolls are positioned in staggered arrangement in the manner shown in Figure 1, and owing to the arrangement of the journals $z^1$ $z^2$ of the roll O the necessary space for the bearings $L^3$ $L^4$ and the journals $z^3$ $z^4$ of the roll M is obtained. The journals $z^5$ $z^6$ and the bearings $L^5$ $L^6$ of the roll U are located like the corresponding journals and bearings of the roll O.

The distances between the centres of the journal bearings $z^1$ $z^2$, between the journal bearings $z^3$ $z^4$, and between the journal bearings $z^5$ $z^6$, is in this case equal to the distance between the centres of the journal bearings of the rolling mills as hitherto constructed.

Each roll is furnished with roller bearings. $R^1$ $R^2$ are the roller bearings of the roll O, $R^3$ $R^4$ those of the roll M, and $R^5$ $R^6$ those of the roll U. Besides these roller bearings, a double-acting axial thrust bearing is provided for each roll. $D^1$ is the thrust bearing of the roll O; $D^2$ is that of the roll M, and $D^3$ that of the roll U. Each of these thrust bearings is located upon an elongation of the respective journal, viz. $z^1$, $z^4$ and $z^5$.

Starting the lower roll is effected in the usual manner. This roll is supported, by the mediation of the casings of its bearings $L^5$ $L^6$, by wedges $K^1$ $K^2$ which may glide in guide pieces $F^1$ $F^2$ connected with the stands $W^1$ $W^2$. The wedges $K^1$ $K^2$ form racks at their lower sides, and cog-wheels Z affixed upon shafts $s$ are meshing with said racks. Each of these shafts is provided with a worm-wheel S rotated by a worm (not shown).

The roll O is suspended in the usual manner from suspension rods $H^1$ $H^2$ (Figure 2), the nuts $t^1$ $t^2$ of which rest upon the top A, whereas wedges $k^1$ $k^2$ inserted into the lower ends of said rods are connected with the casings of the bearings $L^1$ $L^2$. The top A is secured to the stands $W^1$ $W^2$ by means of screws $S^1$ $S^2$ connected with the stands by bolts $l^1$ $l^2$. Re-adjusting during work, and regulating the resistance to pressure, while the roll O is in operation, is effected by pressure screws $d^1$ $d^2$ engaging nuts $m^1$ $m^2$ pressed into the top A and prevented from rotation by suitable means. In order to prevent the accessories, or the casings of the bearings $L^1$ $L^2$ of the roll O respectively, from jamming, which might occur with this arrangement in consequence of the necessary separate actuation of the nuts $t^1$ $t^2$, one of the arrangement and combination of parts illustrated in Figures 5, 6, and 7 may be employed. In Figure 5 the nuts $m$ are elongated beyond the top of the housing and, provided with an exterior thread upon which two nuts $q^1$ $q^2$ are screwed. Between these nuts is a traverse $v$ from which the suspension screws $H^1$ $H^2$ are suspended. By turning the nuts $q^1$ $q^2$ both suspension screws are lifted or lowered simultaneously and uniformly together with the roll O.

In the form of construction shown in Figure 6, a screw-threaded sleeve $e$ is placed upon the top of the housing. The pressure screw $d^1$ passes freely through this sleeve. A nut $i^1$ is screwed upon the sleeve $e$, and another nut $i^2$ is screwed upon the nut $i^1$, and the two nuts hold between them a support $j$ from which the suspension screws are suspended by the mediation of coiled springs, as shown.

In Figure 7 an arrangement is shown, in which each of the pressure nuts $m^1$ $m^2$ is furnished with an elongation extending forth beyond the top A and provided with an external thread upon which is screwed the nut $i$ which carries the nut $i^2$. The support $j^1$ is also in this case located between these nuts, just as in Figure 6.

At the inner sides of the stands $W^1$ $W^2$ are lugs $N^1$ $N^2$ which extend into slots provided in the bearings $L^3$ $L^4$ of the roll M, whereby this roll is held in proper position at the stands. To prevent the roll M from being lifted together with its bearings during the rolling operation, two pairs of vertical bars $B^1$ $B^2$ are provided, one pair on one side of the housing, the other pair on the other side thereof. The lower ends of these rods bear upon the upper surfaces of the bearings $L^3$ $L^4$, as shown in Figure 2. Anyhow, this means is merely an example. Instead of the bars $B^1$ $B^2$ bows may be employed, or wedges may be made use of to hold said bearings in proper position, or to prevent them from being lifted respectively.

Displacing the three rolls in order to adjust exactly the pass, and securing the rolls and the bearing casings in position to enable them to take up the axial pressures, is effected centrally and always from only one side of the individual rolls. For those purposes grooves $u^1$, $u^4$ and $u^5$ are turned into the casings of the bearings $L^1$, $L^4$ and $L^5$, and cranked bars $b^1$, $b^2$, $b^3$, $b^4$ and $b^5$ $b^6$, engage said grooves with their middle portions, as shown in Figures 2 and 3. These figures combined show the actual shape of these cranked bars, and it is to be seen from Figure 3 that the middle part of such a bar has an enlarged portion $r$ which presses against the casing of the bearing. The bars $b^1$ $b^2$, $b^3$ $b^4$, $b^5$ $b^6$ are connected by screws $p^1$ $p^2$, $p^3$ $p^4$, $p^5$ $p^6$ with sliding members $G^1$ $G^2$, $G^3$ $G^4$, $G^5$ $G^6$ shoved upon threaded bolts $y^1$ $y^2$, $y^3 y^4$, $y^5$ $y^6$ screwed into the stands $W^1$ $W^2$. It is obvious that in view of the staggered arrangement of the journals and bearings of the rolls, two pairs of each group of three pairs of the various parts just mentioned are on the left side of the mill (Figure 1) and the third pair is on the right side.

One of the two sliding members connected with a pair of the cranked bars is slotted; thus, for instance, the member $G^1$ (Figure 2) has a slot $x^1$ and the member $G^3$ has a slot $x^3$ and the purpose of this arrangement is to permit a readjustment of the said cranked bars simultaneously with the adjustment of the rolls. The screw-threaded bolts $y^1$ and $y^3$ have nuts $v^1$ $v^1$, or $v^3$ $v^3$ respectively, which press from both sides against the sliding members $G^1$ and $G^3$. When turning these nuts upon their respective bolts, the cranked bars are moved laterally in one or the other direction, according to the direction of rotation of said nuts, and then also the casings of the bearings $L^1$ $L^2$ are drawn home on the respective roll. This refers, thus, to the upper roll, as well as to the middle and the lower one. Of the parts just described only those co-operating with the upper roll (O) have been illustrated in Figure 3, but it is obvious that the parts co-operating with the other two rolls are of completely the same description.

To hold fast the inner ring J upon the journal $z$, the arrangement illustrated in Figure 4 has been devised. A groove T is turned into the elongation of the journal, and the wobbler journal of the roll O is somewhat reinforced at its inner part $Q^1$. The recesses of the wobbler portion are milled down as far as to meet the groove T, and besides, recesses $a$ are provided in the journal portion $Q^1$. A sleeve H, the reinforced exterior rim portion $h$ of which is shaped corresponding to the wobbler and fits with its other inner portion upon that journal portion which is located behind the groove T, may be shoved over the wobbler journal portion $Q^1$ if its recesses lie just suited to those of this latter journal portion. After the sleeve H has been shoved upon said journal portion, it is so much turned that the massive portion of its rim arrives behind the projecting portion of the wobbler journal portiin $Q^1$ and engages with its lugs $n$ the recesses $a$, whereby the sleeve is prevented from turning during the service.

The sleeve H has on its outer surface a screw-thread $g$ upon which a nut M is screwed. By drawing home this nut (provided, a thrust bearing be provided in the respective casing), the thrust ring $D^1$ and the intermediate ring $R^1$ are pressed against the inner ring J of the roll bearing and hold fast in this way the roll bearing $W^1$ upon the roll journal Z. The nut $M^1$ and the sleeve H are provided with a right-handed thread and with a left-handed thread according to the requirement, as well as to the direction of rotation of the rolls, the object being to make it possible to unscrew the nuts and also to screw them home during the rolling. The Figures 8 and 9 show a device for the axial displacement of the rolls.

The accessories $L^3$ $L^4$ of the middle roll M rest upon projections B in the stands $W^1$ $W^2$. The two accessories have flanges C provided with slots through which extend bolts D that are screwed into said stands and by means of which the accessories are prevented from lateral displacement. The bearings $L^1$ $L^2$ of the upper roll O are suspended by rods $t$ from the hood A of the housing and are rigidly connected with each other by a traverse E. If the bearing or accessory piece $L^1$ is displaced towards the middle of the roll, then also the roll O and the bearing or accessory piece $L^2$ are moved along with said parts whereby the pass adjustment is obtained. It can never, therefore, occur with this arrangement that an accessory piece is jammed fast at the roll collar. The arrangement renders it also possible to let the outer rings F of the roller bearings R have some lateral play in the bearing casings $L^1$ $L^2$ whereby a dependable adjustment of the roller bearings is warranted and the roll O may freely expand.

The construction of the parts in question for the lower roll U is the same as that just described for the upper roll O.

Figure 10 shows that form of construction of the mill which has been devised for used rolls. The three-high mill consists also in this case of the rolls O M and U. The means are, however, shown only in connection with the roll M. Those for the rolls O and U are of the same description. The roll M has two journals $Z^1$ $Z^2$ with suspended wobbler portions K. The roll journal $Z^1$ supports the roller bearing $L^1$. The wobbler portion K of the right-hand journal $Z^2$ is removed and the thus formed stump supports the journal $Z^3$ by means of the cap H, and said journal $Z^3$ carries within the bearing casing O the rolling bearing $L^2$ in staggered arrangement with respect to the like part of the other rolls. D is an axial thrust bearing located at the side of the casing O.

At the joint of the journal of the fastening cap is an outwardly extending conical rib, the object of which is to conduct away the cooling water.

I claim:

1. In a rolling mill, the combination, with the rolls and their journals, of journal bearings positioned in staggered arrangement, as set forth.

2. In a rolling mill, the combination, with the rolls and their journals, of journal bearings positioned in alternately staggered arrangement, as set forth.

3. In a rolling mill, the combination, with the rolls and their journals, of journal bearings positioned in alternately staggered arrangement; inner rings forming parts of said bearings; sleeves adapted to be pressed upon said journals and to put said rings under tension and to be secured in place by rotation; and nuts located upon said sleeves and being adapted to be pressed against the said inner rings, as set forth.

4. In a rolling mill, the combination, with the rolls and their journals, of journal bearings positioned in alternately staggered arrangement; inner rings forming parts of said bearings; thrust bearings located in front of said rings; sleeves adapted to be pressed upon said journals and to put said rings under tension and to be secured in place by rotation; and nuts located upon said sleeves and being adapted to be pressed against said thrust bearings, as set forth.

5. In a rolling mill, the combination, with the rolls and their journals, of journal bearings positioned in alternately staggered arrangement; suspension screws extending upwards from the bearings of the upper roll; a traverse rigidly connecting two of the roller bearings with each other; and means to support said traverse, as set forth.

6. In a rolling mill, the combination, with the rolls and their journals, of journal bearings positioned in alternately staggered arrangement; suspension screws extending upwards from the bearings of the upper roll; a support rigidly connecting two of the roller bearings with each other, and extending horizontally from the one suspension screw to the other; threaded sleeves extending upwards through said support; and nuts screwed upon said sleeve and having the said support located between them, as set forth.

7. In a rolling mill, the combination, with the rolls and their journals, of journal bearings positioned in alternately staggered arrangement; one of the rolls being stationary in said housing and the other rollers being rigidly connected with each other, as set forth.

8. In a rolling mill, the combination, with the rolls and their journals, of journal bearings positioned in alternately staggered arrangement; one of the rolls being stationary in said housing and the bearings of the other rolls being rigidly connected with each other, as set forth.

9. In a rolling mill, the combination, with three rolls and their bearings, and with a housing for said rolls and bearings, of means for making the middle roll stationary in said housing, and rigid connections between the bearing casings of the upper rolls and those of the lower ones, as set forth.

10. In a rolling mill, the combination, with the rolls and their journals, of journal bearings positioned in alternately staggered arrangement; the journals serving to receive the staggered bearings being supported upon journal stumps formed by the removal of the wobbler portion of the journal of an old roll, as set forth.

11. In a rolling mill, the combination, with the rolls and their journals, of journal bearings positioned in alternately staggered arangement; the journals serving to receive the staggered bearings being supported upon journal stumps formed by the removal of the wobbler portion of the journal of an old roll; and sleeves located between said latter journals and said stumps, as set foth.

12. In a rolling mill, the combination, with the rolls and their journals, of journal bearings positioned in alternately staggered arrangement; the journals serving to receive the staggered bearings being supported upon journal stumps formed by the removal of the wobbler portion of the journal of an old roll; and an axial thrust bearing combined with this latter journal, as set forth.

13. In a rolling mill, the combination, with the rolls and their journals, of journal bearings positioned in alternately staggered arrangement; the journals serving to receive the staggered bearings being supported upon journal stumps formed by the removal of the wobbler portion of the journal of an old roll; said journal having a conical outwardly extending projecting member, as set forth.

14. In a rolling mill, the combination, with the rolls and their journals, of journal bearings positioned in alternately staggered arrangement; the journals serving to receive the staggered bearings being supported upon journal stumps formed by the removal of the wobbler portion of the journal of an old roll; fastening members located between said latter journals and said stumps; said journals having each a conical, outwardly extending projecting member located at the place of said fastening member, as set forth.

In testimony whereof I affix my signature in presence of two witnesses.

RICHARD HEIN.

Witnesses:
FERD. CLASEN,
KURT SATTER.